US008089621B2

(12) United States Patent
Horio

(10) Patent No.: US 8,089,621 B2
(45) Date of Patent: Jan. 3, 2012

(54) TILT SENSOR

(75) Inventor: Tomoharu Horio, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 168 days.

(21) Appl. No.: 12/696,752

(22) Filed: Jan. 29, 2010

(65) Prior Publication Data
US 2010/0188654 A1    Jul. 29, 2010

(30) Foreign Application Priority Data
Jan. 29, 2009  (JP) .................................. 2009-018030

(51) Int. Cl.
*G01C 11/26*    (2006.01)

(52) U.S. Cl. ................. 356/139; 356/139.01; 250/231.1

(58) Field of Classification Search ........ 356/3.01–3.15, 356/4.01–4.1, 5.01–5.15, 6–22, 28, 28.5, 356/139.01–139.1; 250/231.1
See application file for complete search history.

(56) References Cited

U.S. PATENT DOCUMENTS

| 5,202,559 | A  | * | 4/1993 | Durst ........................ 250/231.1 |
| 6,392,223 | B1 | * | 5/2002 | Hjertman et al. .......... 250/231.1 |
| 6,690,457 | B2 | * | 2/2004 | Yamaguchi ................ 356/139.1 |
| 7,950,162 | B2 | * | 5/2011 | Horio et al. ................ 33/366.23 |

FOREIGN PATENT DOCUMENTS
JP    2007-139643    6/2007
* cited by examiner

*Primary Examiner* — Thomas Tarcza
*Assistant Examiner* — Luke Ratcliffe
(74) *Attorney, Agent, or Firm* — Hamre, Schumann, Mueller & Larson, P.C.

(57) ABSTRACT

A tilt sensor capable of detecting more diverse orientations is to be provided. The tilt sensor includes a light emitting element and a plurality of photodetectors, a rolling element, and a hollow portion that accommodates the rolling element so as to allow the rolling element to roll in all of x-, y-, and z-direction, and to locate the rolling element, according to a direction of the gravity, at one of detecting positions including a complete blocking position that inhibits light from the light emitting element from reaching any of the photodetectors, a plurality of partial blocking positions that inhibits the light from the light emitting element from reaching at least one but not all of the photodetectors, and a nonblocking position that permits the light from the light emitting element to reach all of the photodetectors, and two of the detecting positions are each located on a respective end portion of the hollow portion in the x-, y-, and z-direction.

9 Claims, 9 Drawing Sheets

TILT SENSOR

BACKGROUND OF THE INVENTION

1. Field of the Invention

The present invention relates to a tilt sensor.

2. Description of the Related Art

FIGS. 9 and 10 depict an example of a conventional tilt sensor (see Japanese Laid-open Patent Publication No. 2007-139643). The illustrated tilt sensor X includes a substrate 91, a housing 92, a cover 93, a pair of photodetectors 94A, 94B, a light emitting element 95, and a rolling element 96. (The cover 93 is omitted in FIG. 10.) The pair of photodetectors 94A, 94B and the light emitting element 95 are mounted on a surface of the substrate 91, and enclosed in the housing 92. The housing 92 and the cover 93 define a hollow portion or space 92a. The hollow portion 92a is of such a shape that permits light from the light emitting element 95 to enter the space, and that causes the light reflected by the housing 92 to reach the photodetectors 94A, 94B. The hollow portion 92a contains the rolling element 96. The rolling element 96 is of a circular column shape, and free to roll inside the hollow portion 92a along the xy-plane. The lower surface of the substrate 91 is formed with terminals for surface mounting of the tilt sensor on a circuit board, for example.

FIG. 10 illustrates a state where the rolling element 96 is superposed on the light emitting element 95 under the pull of gravity. In this state, the light emitted by the light emitting element 95 is blocked by the rolling element 96, thereby inhibited from reaching neither of the photodetectors 94A, 94B. In the case where the tilt sensor X is inclined to the left from the state shown in FIG. 10, the rolling element 96 becomes superposed on the photodetector 94A. In this state, the light from the light emitting element 95 solely reaches the photodetector 94B. On the contrary, when the tilt sensor X is inclined to the right from the state shown in FIG. 10, the rolling element 96 becomes superposed on the photodetector 94B, in which case the light from the light emitting element 95 solely reaches the photodetector 94A. In the case where the tilt sensor X is implemented on a circuit board for example, a tilting motion of the circuit board about an axis perpendicular thereto can be detected through monitoring the photo detection signal from the pair of photodetectors 94A, 94B. Employing such tilt sensor X enables detecting, for example, a vertical or horizontal orientation of a mobile phone set by the user viewing the display screen thereof, and changing the orientation of the image on the display screen according to the orientation of the mobile phone.

The tilt sensor X thus designed is intended for detecting an orientation in the case where the tilt sensor is rotated about the axis extending in a z-direction (Ref. FIG. 9), from the state shown in FIG. 10. Accordingly, it is difficult to detect the orientation with the tilt sensor X in the case where the tilt sensor is rotated about an axis extending in an x-direction, from the state shown in FIG. 10. To utilize the tilt sensor X for more various purposes, it is preferable that the tilt sensor X is capable of detecting more diverse orientations.

SUMMARY OF THE INVENTION

The present invention has been proposed under the foregoing circumstances. It is therefore an object of the present invention to provide a tilt sensor capable of detecting more diverse orientations.

The present invention provides a tilt sensor comprising a light emitting element and a plurality of photodetectors, a rolling element, and a hollow portion that accommodates the rolling element so as to allow the rolling element to roll in a first direction, a second direction different from the first direction, and a third direction different from the first and the second direction, and to locate the rolling element, according to a direction of the gravity, at one of detecting positions including a complete blocking position that inhibits light from the light emitting element from reaching any of the photodetectors, and a plurality of partial blocking positions that inhibits the light from the light emitting element from reaching at least one but not all of the photodetectors, or including the complete blocking position, the plurality of partial blocking positions, and a nonblocking position that permits the light from the light emitting element to reach all of the photodetectors, wherein two of the detecting positions are each located on a respective end portion of the hollow portion in the first, the second, and the third direction.

The tilt sensor thus configured allows detecting the orientation, irrespective of which of the forward and the backward direction in the first, the second, and the third direction is aligned with the gravity direction. Such tilt sensor can, therefore detect more diverse orientations.

Preferably, the hollow portion communicates at the complete blocking position with a light emission port through which the light from the light emitting element is emitted, at the partial blocking position with a light reception port through which the light is incident upon the photodetector.

Preferably, the hollow portion is of a spherical shape. Such configuration facilitates the rolling element to roll.

Preferably, the hollow portion is of a regular octahedral shape, in which the light emission port and the light reception port are each located on an apex.

Preferably, the first, the second, and the third direction are orthogonal to each other.

Preferably, the complete blocking position and the partial blocking position are located on the respective end portions of the hollow portion in the first direction.

Preferably, the complete blocking position and the nonblocking position are located on the respective end portions of the hollow portion in the first direction.

Preferably, the rolling element is of a spherical shape. Such configuration facilitates the rolling element to roll.

Other features and advantages of the present invention will become more apparent through the following detailed description given with reference to the accompanying drawings.

DETAILED DESCRIPTION OF THE PREFERRED EMBODIMENTS

Embodiments of the present invention will be described below with references to the accompanying drawings.

Referring to FIGS. 1 to 6, a first embodiment of the present invention will be described.

Figure 1:
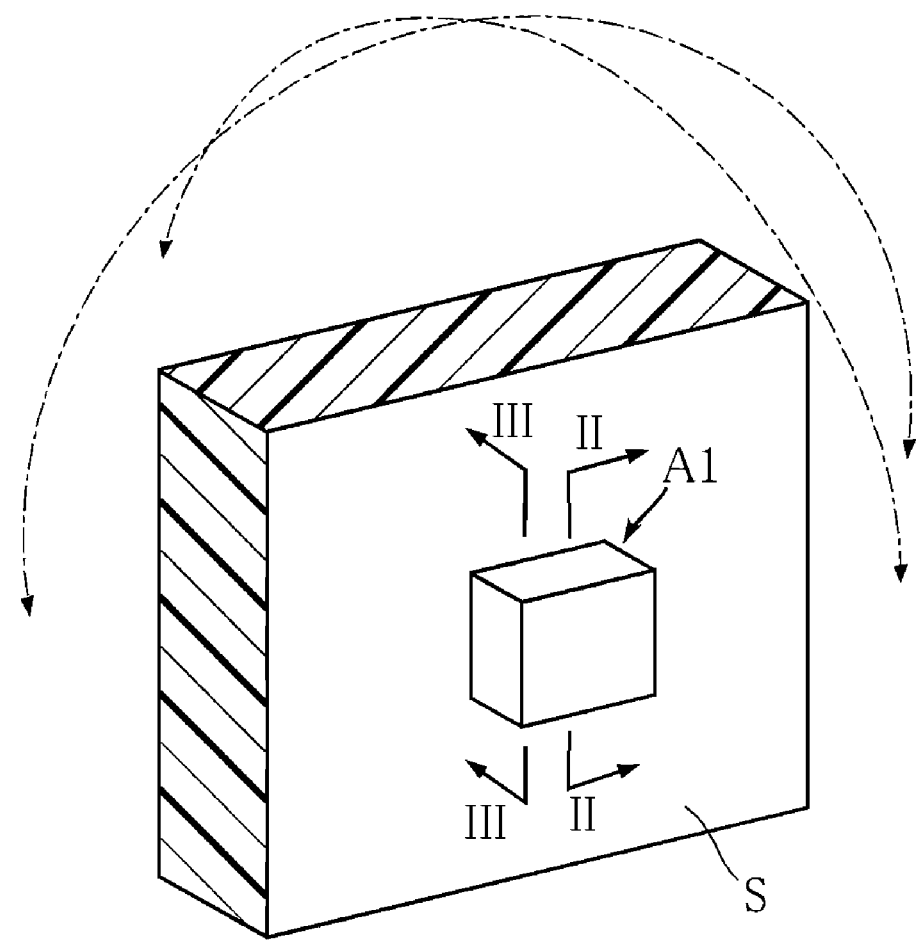
FIG. 1 is a perspective view showing a tilt sensor according to a first embodiment of the present invention.
Figure 2:
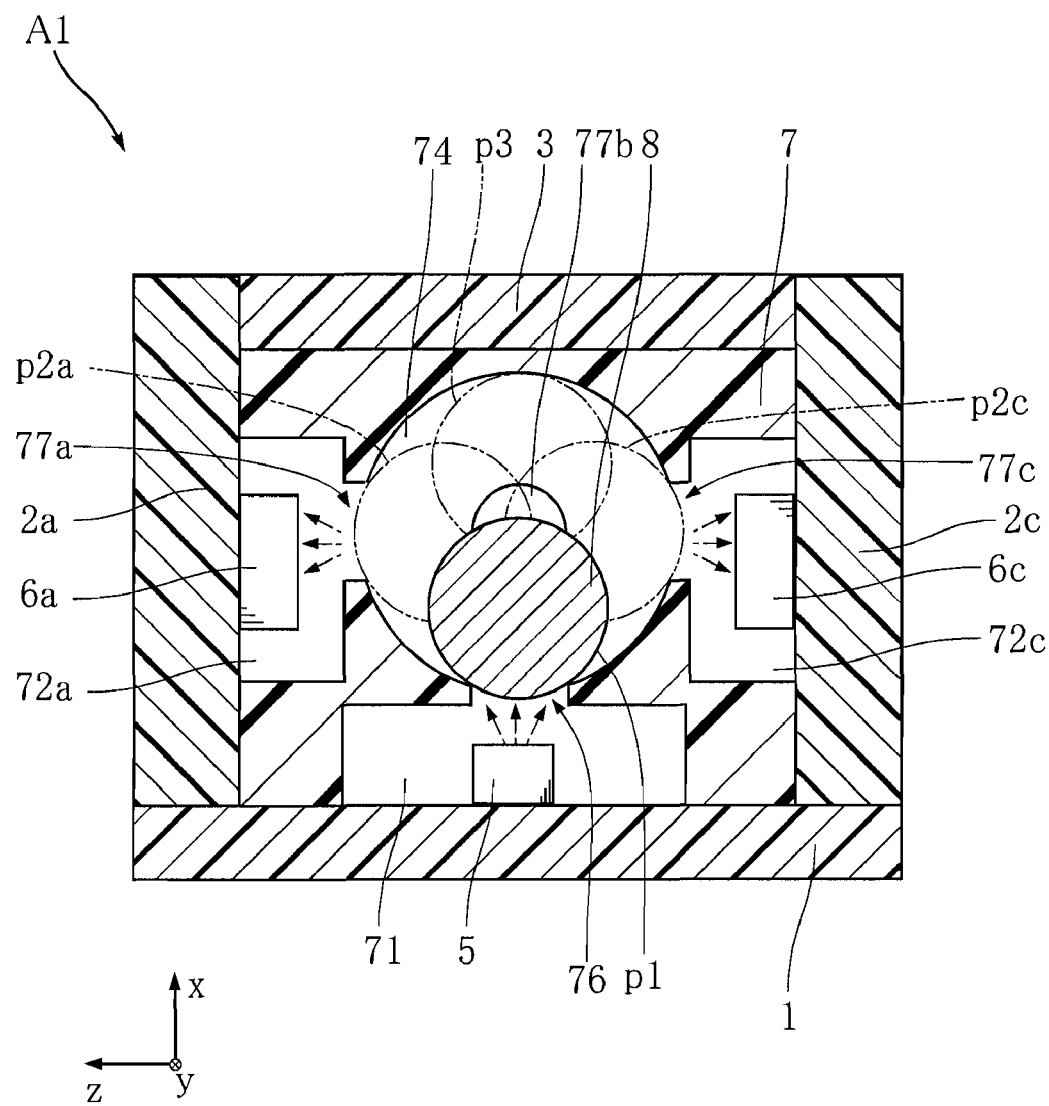
FIG. 2 is a cross-sectional view taken along a line II-II in FIG. 1.
Figure 3:
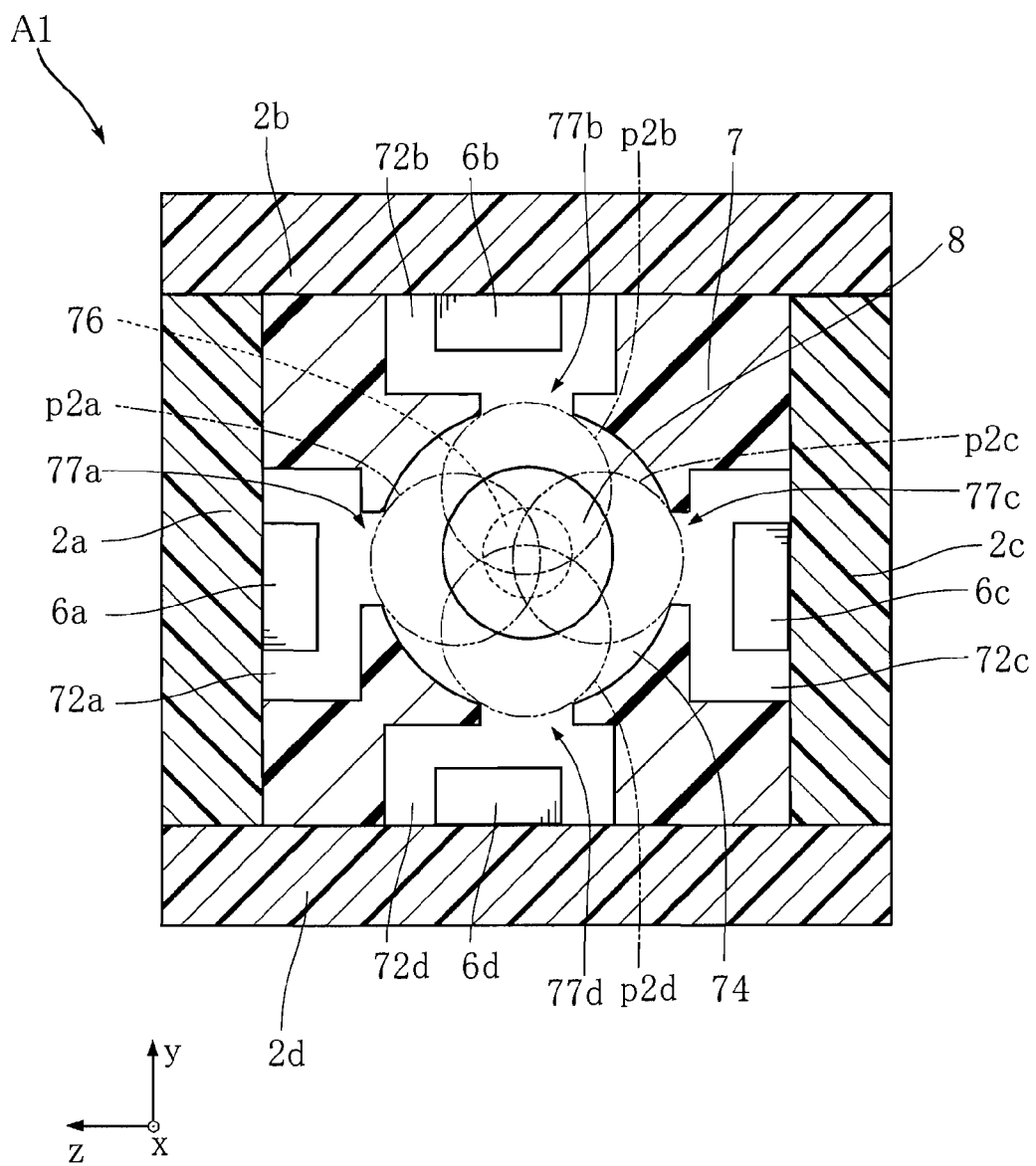
FIG. 3 is a cross-sectional view taken along a line III-III in FIG. 1.

As shown in FIG. 1, the tilt sensor A1 of the first embodiment is surface-mounted on e.g. a circuit board S for detection of an inclination with respect to the vertical direction (i.e. the direction of gravity). The tilt sensor A1, generally square in plan, has a size of approximately 1.5 to 3.0 mm for each side of the square. As shown in FIGS. 2 and 3, the tilt sensor A1 includes a base substrate 1, lateral substrates 2a, 2b, 2c, 2d, a cover substrate 3, a light emitting element 5, photodetectors 6a-6d cooperating with the light emitting element 5, a contoured resin member 7, and a rolling element 8. The directions x, y and z mutually define an angle of 90 degrees (that is, the three directions are perpendicular to each other).

Referring to FIG. 2, the base substrate 1 is a rectangular insulating substrate. The base substrate 1 extends along a yz-plane. The base substrate 1 is made of, for example, a glass epoxy resin (glass fiber-reinforced epoxy), and provided with wiring patterns (not shown). The wiring patterns are made of, for example, a Cu—Ni—Au plated layer. The wiring patterns include portions formed on the upper and lower surfaces of the base substrate 1 and portions in through-holes for electrically connecting the upper and lower wiring portions. The light emitting element 5 is mounted, by die-bonding, on the wiring portion formed on the upper surface of the base substrate 1. The wiring portion formed on the lower surface of the base substrate 1 serves as terminals for surface-mounting the tilt sensor A1 on the circuit board S.

The light emitting element 5 is an infrared beam emitting diode, for example. In this embodiment, the size of the light emitting element 5 is approximately 0.25 mm for each side of the square. For the light emitting element 5, use may be made of a diode adapted to emit light of different wavelengths (e.g. visible light) than the infrared beam.

Referring to FIGS. 2 and 3, the lateral substrates 2a, 2b, 2c, 2d are rectangular insulating substrates. The lateral substrates 2a to 2d are held upright with respect to the base substrate 1. As shown in FIG. 3, the lateral substrates 2a and 2c extend in the y-direction, facing each other. The lateral substrates 2b and 2d extend in the z-direction, facing each other. The lateral substrates 2a to 2d are made of a glass epoxy resin. The lateral substrates 2a to 2d are bonded to a surface of the base substrate 1 at the respective end portions in the x-direction. As shown in FIG. 3, the adjacent ones of the lateral substrates 2a to 2d are bonded to each other, and thereby constitute a frame, as viewed in the yz-plane (in other words, as viewed in the x-direction). The inner surfaces of the lateral substrates 2a to 2d (the inner sides of the frame shown in FIG. 3) are provided with wiring patterns (not shown) made of, for example, a Cu—Ni—Au plated layer, as those provided on the base substrate 1.

The photodetectors 6a, 6b, 6c, 6d are mounted, by die-bonding, on the wiring patterns formed on the lateral substrates 2a, 2b, 2c, 2d, respectively. The photodetectors 6a, 6c are disposed so as to face each other. The photodetectors 6b, 6d are disposed so as to face each other. The photodetectors 6a to 6d are, for example, phototransistors adapted to generate photovoltaic power upon receiving infrared beam, thereby causing a current flow. The size of each photodetector 6a to 6d is approximately 0.6 mm×0.4 mm.

The contoured resin member 7 is provided on the base substrate 1 and surrounded by the lateral substrates 2a to 2d.

The resin member 7 is made of, for example, an epoxy resin. The resin member 7 is formed with an internal hollow portion 74. An accommodation space 71 is defined by the resin member 7 and the base substrate 1. Likewise, accommodation spaces 72a to 72d are defined by the resin member 7 and the lateral substrates 2a to 2d, respectively.

As shown in FIG. 2, the accommodation space 71 accommodates the light emitting element 5. A light emission port 76 is provided between the accommodation space 71 and the hollow portion 74. The light emission port 76 serves as a path through which the light from the light emitting element 5 is emitted into the hollow portion 74.

As shown in FIG. 3, the accommodation spaces 72a to 72d each accommodate the photodetectors 6a to 6d, respectively. Between each of the accommodation spaces 72a-72d and the hollow portion 74, a light reception port 77a-77d is provided, respectively. The light reception ports 77a to 77d serve as a path through which the light travels from the hollow portion 74 to the photodetectors 6a to 6d.

The hollow portion 74 accommodates the rolling element 8 in a manner such that the rolling element 8 can move freely (by gravity) to take one of predetermined detecting positions, depending on the posture of the tilt sensor A1. The hollow portion 74 in this embodiment is generally spherical, though the present invention is not limited to this. The hollow portion 74 communicates with the light emission port 76 and also with the respective light reception ports 77a to 77d.

The rolling element 8 moves within the hollow portion 74 as the posture of the tilt sensor A1 changes. At a given detecting position, the rolling element 8 can block the light from the light emitting element 5, so that the light does not reach a selected one or ones of the photodetectors 6a to 6d. The rolling element 8 is of a spherical shape, having a diameter of 0.7 to 0.8 mm, for example. The rolling element 8 is made of a metal having relatively high density, such as stainless steel or tungsten.

Tilt detection by the tilt sensor A1 is performed in the following manner.

FIGS. 2 and 3 illustrate an initial state (or default state) of the tilt sensor A1. In FIG. 2 (and FIGS. 4 to 6), the downward direction is a direction in which the rolling element 8 is pulled by the gravity. In the initial state, the rolling element 8 in the hollow portion 74 is located in front of the light emission port 76 or at a complete blocking position p1 (one of the detecting positions), thereby closing the port 76 as a whole. The hollow portion 74 is regarded as being connected to the light emission port 76 at the complete blocking position p1.

When the rolling element 8 is at the complete blocking position p1, the light from the light emitting element 5 is completely blocked by the rolling element 8. Accordingly, the light does not reach any photodetectors 6a to 6d. Consequently, when none of the photodetectors 6a to 6d provide any photo detection signal, it can be determined that the tilt sensor A1 is held in the default orientation shown in FIG. 2.

Figure 4:
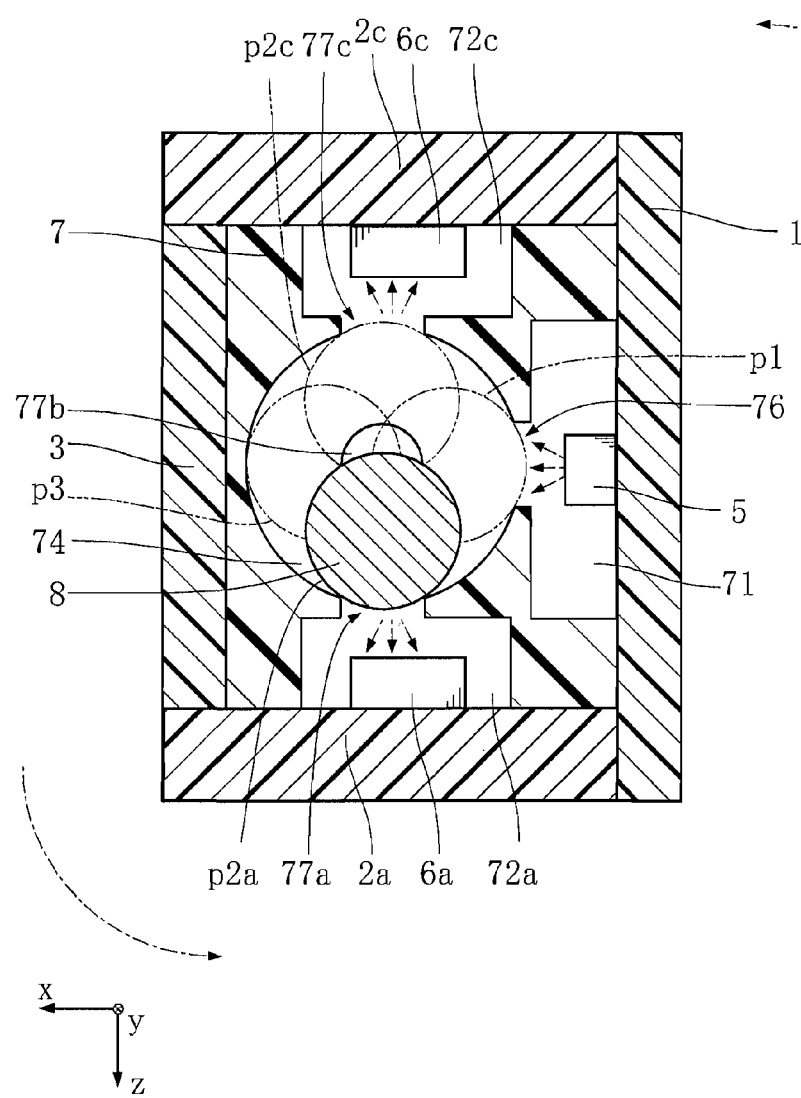
FIG. 4 is a cross-sectional view for explaining use of the tilt sensor according to the present invention.

FIG. 4 depicts a state where the tilt sensor A1 has been rotated counterclockwise by approximately 90 degrees from the orientation shown in FIG. 2 about an axis extending perpendicularly to the drawing sheet (in the y-direction). Such rotation causes the rolling element 8 to move, under the gravity, toward an end of the hollow portion 74 in the z-direction. Then the rolling element 8 comes to a position in front of the light reception port 77a (partial blocking position p2a; one of the detecting positions), thereby blocking the port 77a. The hollow portion 74 is regarded as being connected to the light reception port 77a at the partial blocking position p2a When the rolling element 8 is at the partial blocking position p2a, the light from the light emitting element 5 does not reach the photodetector 6a. On the other hand, the light from the light emitting element 5 can reach the other photodetectors 6b, 6c and 6d. Accordingly, when only the photodetectors 6b, 6c and 6d output photo detection signal, it can be determined that the rolling element 8 is at the partial blocking position p2a and hence the tilt sensor A1 is oriented as shown in FIG. 4.

Figure 5:
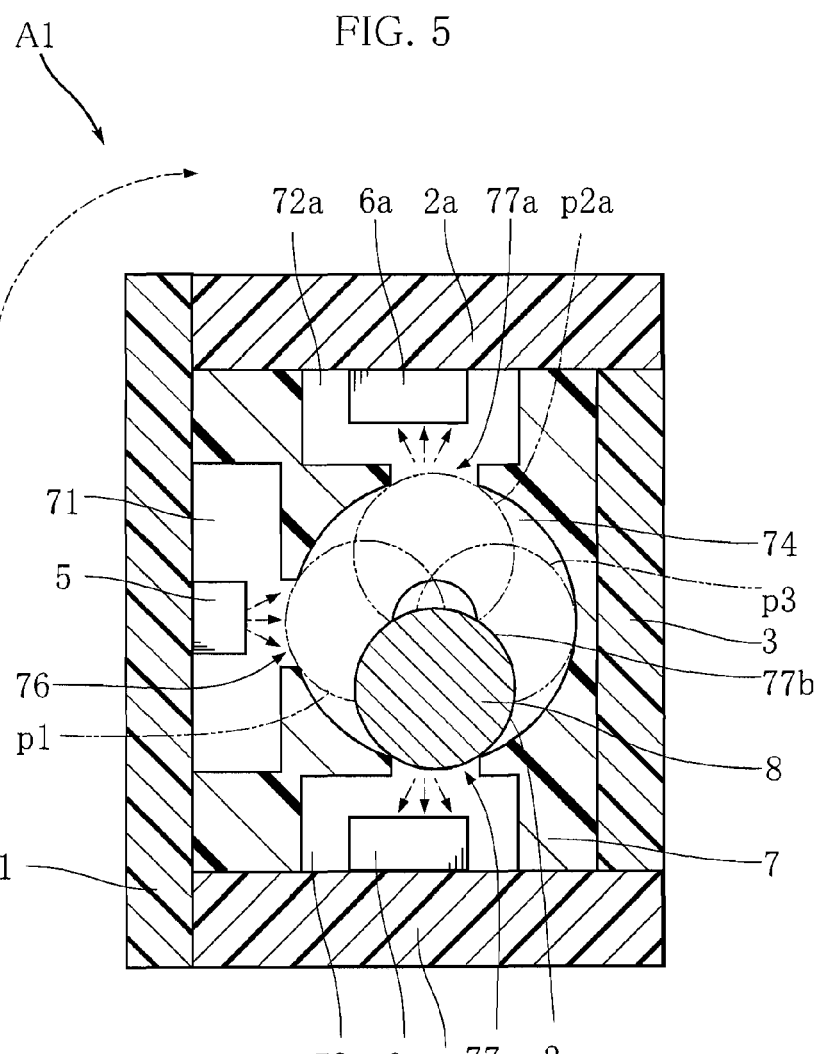
FIG. 5 is another cross-sectional view for explaining use of the tilt sensor according to the present invention.

FIG. 5 depicts a state where the tilt sensor A1 has been rotated clockwise by approximately 90 degrees from the orientation shown in FIG. 2 about an axis extending perpendicularly to the drawing sheet (y-direction). Such rotation causes the rolling element 8 to move, under the gravity, toward another end of the hollow portion 74 in the z-direction. Then the rolling element 8 comes to a position in front of the light reception port 77c (partial blocking position p2c; one of the detecting positions), thereby blocking the light reception port 77c. As seen from FIG. 5, the partial blocking position p2c and the above-noted partial blocking position p2a are aligned along a line extending in the z-direction (that is, the centers of the respective positions p2c and p2a are on the single line extending in the z-direction), partially overlapping with each other. The hollow portion 74 is connected to the light reception port 77c at the partial blocking position p2c.

When the rolling element 8 is at the partial blocking position p2c, the light from the light emitting element 5 does not reach the photodetector 6c. On the other hand, the light from the light emitting element 5 can reach the other photodetectors 6a, 6b and 6d. Accordingly, when only the photodetectors 6a, 6b, 6d output photo detection signals, it can be determined that the rolling element 8 is at the partial blocking position p2c and hence the tilt sensor A1 is oriented as shown in FIG. 5.

Figure 6:
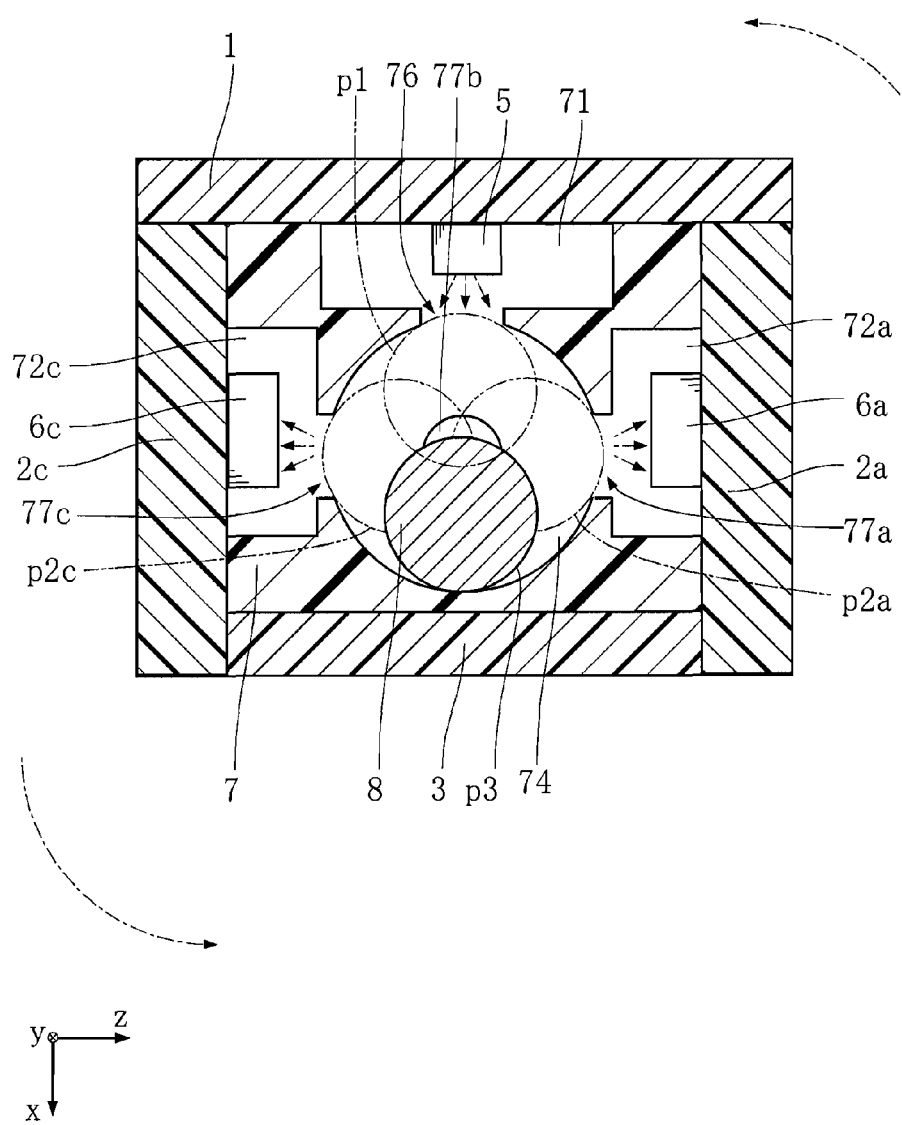
FIG. 6 is still another cross-sectional view for explaining use of the tilt sensor according to the present invention.

FIG. 6 depicts a state where the tilt sensor A1 has been rotated by approximately 180 degrees from the state shown in FIG. 2 about an axis extending perpendicularly to the drawing sheet (y-direction). Such rotation causes the rolling element 8 to move, under the gravity, toward another end of the hollow portion 74 in the x-direction. Then the rolling element 8 reaches a position (nonblocking position p3; one of the detecting positions) which is opposite to the light emission port 76. At this position, the rolling element 8 does not block the light emission port 76 nor any one of the light reception ports 77a-77d. As seen from FIG. 6, the nonblocking position p3 and the above-noted complete blocking position p1 are aligned along a line extending in the x-direction, partially overlapping with each other.

When the rolling element 8 is at the nonblocking position p3, the light from the light emitting element 5 is emitted into the hollow portion 74 through the light emission port 76. Then, the light reaches all the photodetectors 6a-6d through the light reception ports 77a-77d respectively, without being blocked by the rolling element 8. Accordingly, when all of the photodetectors 6a-6d output photo detection signals, it can be determined that the rolling element 8 is at the nonblocking position p3 and hence the tilt sensor A1 is oriented as shown in FIG. 6.

Though not illustrated, a rotation of the tilt sensor A1 from the orientation shown in FIGS. 2 and 3 about an axis extending in the z-direction causes the rolling element 8 to move so as to block the light reception ports 77b, 77d. In FIG. 3, such positions of the rolling element 8 are indicated as partial blocking positions (detecting positions) p2b and p2d, respectively. The partial blocking position p2b is located at an end of the hollow portion 74 in the y-direction, and the partial blocking position p2d at the other end. In other words, the partial blocking position p2b and the partial blocking position p2d are aligned along a line extending in the y-direction, partially overlapping with each other. The hollow portion 74 is connected to the light reception port 77b at the partial blocking position p2b, while being also connected to the light reception port 77d at the partial blocking position p2d. When the rolling element 8 is located at the partial blocking position p2b or p2d, the orientation of the tilt sensor A1 can also be determined in the same manner described above.

With the above-described arrangements, the tilt sensor A1 is advantageous in the following respects.

When the tilt sensor A1 is tilted or rotated, starting from the orientation shown in FIG. 2, about an axis extending in the y-direction, the rolling element 8 moves to take one of the complete blocking position p1, the partial blocking positions p2a, p2c, and the nonblocking position p3. Likewise, when the tilt sensor A1 is tilted or rotated about an axis extending in the z-direction, the rolling element 8 moves to take one of the complete blocking position p1, the partial blocking positions p2b, p2d, and the nonblocking position p3. Accordingly, the tilt sensor A1 can detect six orientations (two for each of the x, y and z-directions), depending on which one of the six detecting positions is located the lowest.

The rolling element 8 has a spherical shape. Thus, the rolling element 8 can move smoothly in the hollow portion 74 and can block the light emission port 76 and the light reception ports 77a-77d without leaving a gap.

Figure 7:
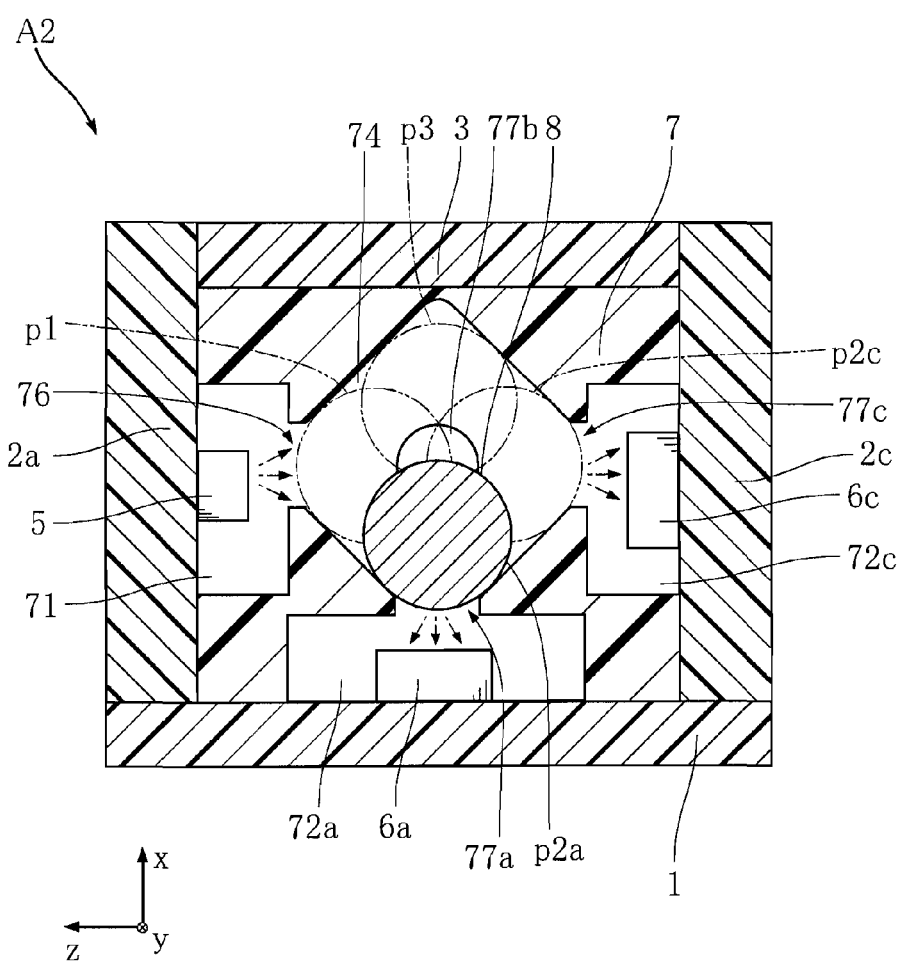
FIG. 7 is a cross-sectional view showing a tilt sensor according to a second embodiment of the present invention.
Figure 8:
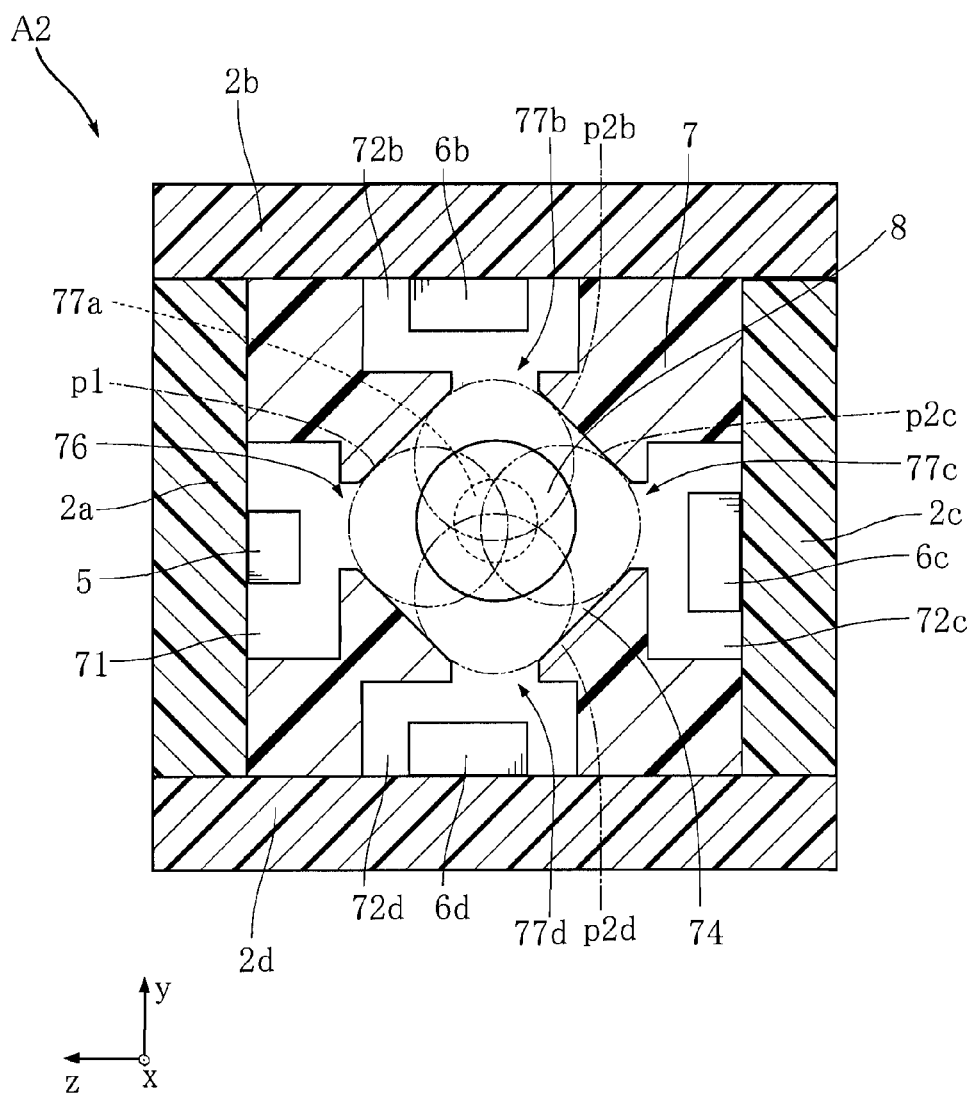
FIG. 8 is another cross-sectional view showing a tilt sensor according to the second embodiment of the present invention.
Figure 9:
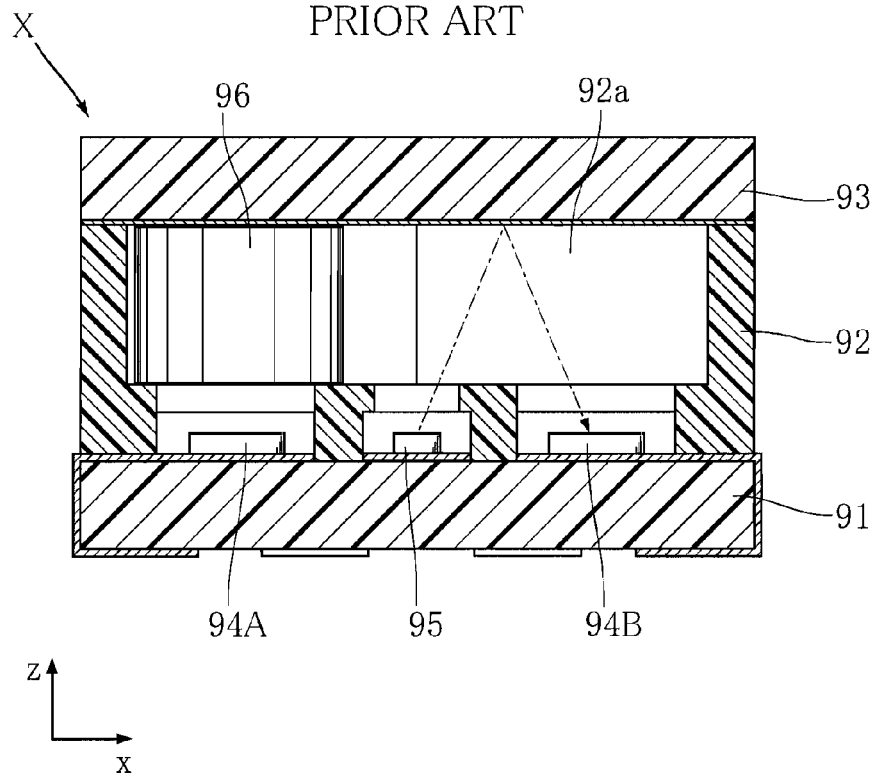
FIG. 9 is a cross-sectional view of a conventional tilt sensor.
Figure 10:
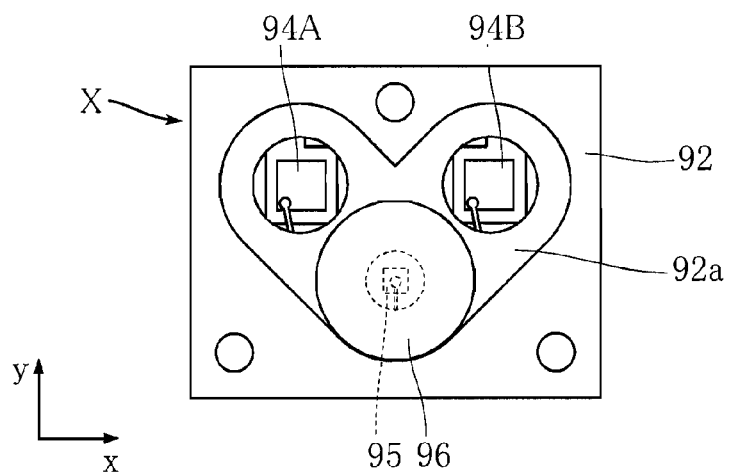
FIG. 10 is a front view of the conventional tilt sensor.

FIGS. 7 and 8 illustrate a second embodiment of the present invention. In these drawings, elements identical or similar to those of the foregoing embodiment are indicated by the same signs. FIGS. 7 and 8 correspond to FIGS. 2 and 3 (the first embodiment), respectively, except for the following differences.

FIG. 7 is a cross-sectional view of a tilt sensor A2 as viewed in the xz-plane. FIG. 8 is a cross-sectional view of a tilt sensor A2 as viewed in the yz-plane. The illustrated tilt sensor A2 is different from the tilt sensor A1 of the first embodiment in that the hollow portion 74 is octahedral, with the light emission port 76 and the light reception ports 77a-77d are each located on one of the apexes, and also in that the light emitting element 5 and the photodetector 6a are exchanged in position. Accordingly, the accommodation space 71 and the accommodation space 72a are exchanged, the light emission port 76 and the light reception port 77a are exchanged, and the complete blocking position p1 and the partial blocking position p2a are exchanged.

As shown in FIGS. 7 and 8, in the hollow portion 74, the complete blocking position p1 and the partial blocking position p1c are aligned along a lien extending in the z-direction, partially overlapping with each other. Likewise, the nonblocking position p3 and the partial blocking position p2a are aligned along a line extending in the x-direction, partially overlapping with each other.

According to the second embodiment, since the hollow portion 74 is octahedral, the inner surfaces defining the hollow portions 74 (in other words, the inner surfaces which are located between the port 76, the port 77a, the port 77b, the port 77c and the port 77d) are substantially flat. Such configuration enables stable positioning of the rolling element 8 at each of the detecting positions (i.e. the complete blocking position p1, the partial blocking positions p2a-p2d, and the nonblocking position p3), thereby contributing to accurate tilt detection.

The scope of the present invention is not limited to the foregoing embodiments. The specific structure of each part of the tilt sensor according to the present invention may be varied in various ways. In the above-described tilt sensors A1 and A2, a nonblocking position p3 is provided. Alternatively, the nonblocking position p3 may be replaced by a partial blocking position, with an additional photodetector disposed near the partial blocking position. In the tilt sensor A1 with the spherical hollow portion 74, the light emitting element 5 and the photodetectors 6a-6d may be arranged in the same way as those of the second embodiment. Likewise, in the tilt sensor A2 with the octahedral hollow portion 74, the light emitting element 5 and the photodetector 6a-6d may be arranged in the same way as those of the first embodiment.

In the foregoing embodiments, six detecting positions (the complete blocking position p1, the partial blocking positions p2a-p2d, the nonblocking position p3) are distributed in equal number for each of the three directions (x, y and z) and are arranged in a manner such that two detecting positions for the same direction are aligned to each other in this direction. Alternatively, the nonblocking position p3 and the complete blocking position p1, for example, may not be completely aligned in the x-direction, but may be shifted apart from each other as viewed in the x-direction. The light emitting element 5 and the photodetectors 6a to 6d may all be mounted on the base substrate 1. Further, three directions (corresponding to the above-mentioned x, y and z-directions) may not be perpendicular to each other, but may be slanted at a predetermined angle. In this manner, it is possible to modify the tilt sensor so as to detect a different set of tilt angles.

The above mentioned tilt sensor can be utilized in several manners, equipped in various products. When the tilt sensor is equipped in a cell phone, a camera, a digital photo frame, a PDA (personal digital assistant), the tilt sensor is utilized to rotate a picture of a display according to the direction of the display equipped in the products. Furthermore, when the cell phone is put on a desk with its display oppose to the desk, the tilt sensor is also utilized to turn off the display (i.e., the tilt sensor is utilized as upside-down detecting sensor).

When the tilt sensor is equipped in a controller of a game machine, a cell phone or a PDA, the tilt sensor is utilized to play game or to control the brightness of a display equipped in the products according to the direction of the products.

When the tilt sensor is equipped in a television, the tilt sensor is utilized to turn off the power when the television is tumbled. Likewise, when the tilt sensor is equipped in a household electrical equipment like a compact heater or a stove, the tilt sensor is utilized to turn off the power in case of the tumble of them.

The invention claimed is:

1. A tilt sensor comprising:
    a light emitting element for emitting detection light;
    a plurality of photodetectors for detecting the detection light; and
    a rolling element accommodated in a hollow portion and movable, within the hollow portion, in a first direction, in a second direction different from the first direction, and in a third direction different from both the first direction and the second direction, the hollow portion being provided with six detecting positions, of which two detecting positions are arranged in the first direction, two detecting positions are arranged in the second direction, and two detecting positions are arranged in the third direction; wherein:
    the six detecting positions include a complete blocking position and a plurality of partial blocking positions; and
    when in the complete blocking position, the rolling element prevents the detection light from reaching any one of the photodetectors, and when in one of the partial blocking positions, the rolling element prevents the detection light from reaching one of the photodetectors that corresponds to said one of the partial blocking positions, while also allowing the detection light to reach the remaining ones of the photodetectors.

2. The tilt sensor according to claim 1, wherein the six detection positions includes a nonblocking position, and when in the nonblocking position, the rolling element allows the detection light to reach any one of the photodetectors.

3. The tilt sensor according to claim 1, further comprising: a light emission port communicating with the hollow portion; and a plurality of light reception ports each communicating with the hollow portion; wherein the light emission port is arranged to allow the detection light to go into the hollow portion, and each of the light reception ports is arranged to allow the detection light to go toward a corresponding one of the photodetectors.

4. The tilt sensor according to claim 3, wherein the hollow portion is spherical.

5. The tilt sensor according to claim 3, wherein the hollow portion has an octahedral shape, and the light emission port and the light reception ports are each located on an apex of the octahedral shape.

6. The tilt sensor according to claim 1, wherein the first direction, the second direction, and the third direction are perpendicular to each other.

7. The tilt sensor according to claim 1, wherein the complete blocking position and one of the partial blocking positions are arranged in the first direction.

8. The tilt sensor according to claim 2, wherein the complete blocking position and the nonblocking position are arranged in the first direction.

9. The tilt sensor according to claim 1, wherein the rolling element has a spherical shape.

* * * * *